United States Patent
Arai et al.

[11] Patent Number: 5,610,887
[45] Date of Patent: Mar. 11, 1997

[54] ERROR CORRECTING APPARATUS WITH ERROR CORECTING SIGNAL HOLDING FUNCTION

[75] Inventors: Masashi Arai; Akira Tsukihashi, both of Gunma, Japan

[73] Assignee: Sanyo Electric Co., Ltd., Osaka, Japan

[21] Appl. No.: 342,529

[22] Filed: Nov. 21, 1994

[51] Int. Cl.⁶ .................................................. G11B 7/095
[52] U.S. Cl. .................................. 369/44.35; 369/44.25; 369/44.36; 369/44.34
[58] Field of Search ........................... 369/44.35, 44.36, 369/44.34, 44.25, 44.29, 44.41

[56] References Cited

U.S. PATENT DOCUMENTS 5,138,596  8/1992  Yamada ........................... 369/44.35 X
5,245,599  9/1993  Ishii et al. ........................ 369/44.36 X
5,291,466  3/1994  Kwak ................................ 369/44.35

Primary Examiner—Thang V. Tran
Attorney, Agent, or Firm—Loeb & Loeb LLP

[57] ABSTRACT

An error signal generating circuit for adjusting a position of a sub-beam on an optical disc to a correct one. A timing circuit generates a test signal so that a driver drives a tracking coil. As a result, a difference signal is generated in a difference signal generating circuit and is then compared to a reference value in a comparing circuit. A controlling signal is generated in a controlling circuit in reply to a comparing error so as to be held in a holding circuit. The thus held controlling signal is converted into an analog signal in a D/A converter and is then applied to a VCA to vary the amplifying rate, such that the difference signal becomes zero when a correct tracking operation is being carried out.

8 Claims, 3 Drawing Sheets

ERROR CORRECTING APPARATUS WITH ERROR CORECTING SIGNAL HOLDING FUNCTION

BACKGROUND OF THE INVENTION

1. Field of the Invention

The present invention relates to an error signal generating circuit which can be applied to an optical disc reproducing apparatus.

2. Description of the Related Art

Generally in an optical disc reproducing apparatus, there has been known, as a method for detecting errors in the tracking direction of the optical disc, a so-called 3-beam method including a main beam used for controlling a digital data reading operation or focus controlling operation, and two sub-beams used for following the track. FIG. 1 shows an example of a circuit for generating a tracking error signal by the use of sub-beams and adjusting the position of the sub-beams on the optical disc.

In FIG. 1, photo diodes 1 and 2 detect reflected light of the sub-beams and generate a detecting signal in reply to the amount of the reflected light. After being amplified in amplifiers 3 and 4, the detected signal is input to LPFs 5 and 6 to get rid of any high-frequency component due to pits. The pits-free detected signals are then mutually subtracted in a difference signal generating circuit 7 to generate a difference signal which is used as a tracking error signal. The difference signal is phase-compensated in a servo phase compensating circuit 8 and is then applied to a driver 9 which corrects the position of the sub-beams on the optical disc by driving the tracking coil 10 to cause the difference signal to become zero.

In such a 3-beam method, when the sub-beams are accurately tracking on the optical disc, the amount of reflected light of the sub-beams is the same. This means that the magnitude of the detected signals from the photo diodes 1 and 2 is the same, so as not to render any difference signal. As a result, no operation for correcting the sub-beam position on the optical disc is carried out. In the case of any tracking error taking place, the amount of reflection of the sub-beams will become different, so that the difference signal generating circuit 7 generates a difference signal to correct the sub-beam position for accurately performing the tracking operation. In this manner, it is possible to always track stably and correctly on the disc.

In such a system, however, there has been a fear of generating a tracking error even if the sub-beams are in the correct positions on the optical disc because the opto-current conversion efficiencies of the pair of photo diodes 1 and 2 are different from each other.

To cope with the above-mentioned disadvantage, there has been carried out an adjustment in order not to generate any tracking error signal at a position where the sub-beams correctly track, by setting the feed-back resistor of the amplifier 4 as a variable resistor so as to vary the gain of the amplifier 4.

The characteristics of the variable resistor however tend to change depending on vibration or with the passage of time, so that sometimes, a tracking error signal may appear even if the sub-beams are on the correct positions on the optical disc.

Further, such a type of adjustment is carried out by the use of an adjusting disc during the manufacturing processes, in such a manner that the adjusting disc is rotated to adjust an average value of the signals, generated when the beams cross a plurality of tracks on the disc, to a reference value. In this method, however, for high-accuracy adjustment it requires an excessively long time, leading to a decrease of the manufacturing efficiency.

SUMMARY OF THE INVENTION

It is therefore an object of this invention to provide an error correcting apparatus for correcting an error by driving a load in reply to an error signal as a difference of a plurality of input signals, comprising amplifying means, for amplifying an input signal, with its amplifying rate being variable; difference signal generating means connected to said amplifying means and outputting a difference signal between amplified input signals; comparing means connected to the difference signal generating means for comparing the difference signal and a reference signal and outputting a first error signal; controlling means connected to the comparing means for outputting a controlling signal for varying the amplifying rate of the amplifying means in reply to the first error signal; and holding means connected to the controlling means for holding the controlling signal.

According to a second aspect of this invention, the apparatus further comprises: driving means for driving a load in reply to the difference signal; switching means provided between the difference signal generating means and the driving means for switching the difference signal and the test signal; and timing generating means for selectively performing the switching operation of the switching means and the generation of the test signal and controlling the operational timing of the controlling means. The holding means includes a plurality of flip-flops for holding the controlling signal by being serially switched.

In this invention, the two input signals are respectively amplified by a plurality of, e.g. two, amplifying means, and mutually subtracted in the difference signal generating means. The load is then driven in accordance with a difference signal generated by the subtracting operation. At the adjustment, a timing signal generated from the timing generating means switches the switching means and applies the test signal to the driver, while the controlling means operates based on the timing signal. When a difference signal is generated by driving the load, for example, a tracking coil, the comparing means compares the difference signal to the reference value, and the controlling means generates a controlling signal in accordance with the error output of the comparing means, the controlling signal being then held in the holding means. The thus held controlling signal is applied to two amplifying means so that the amplifying rate of the amplifying means is adjusted so as not to generate any error between the difference signal and the reference signal from the difference signal generating means.

DETAILED DESCRIPTION OF THE PREFERRED EMBODIMENTS

Figure 1:
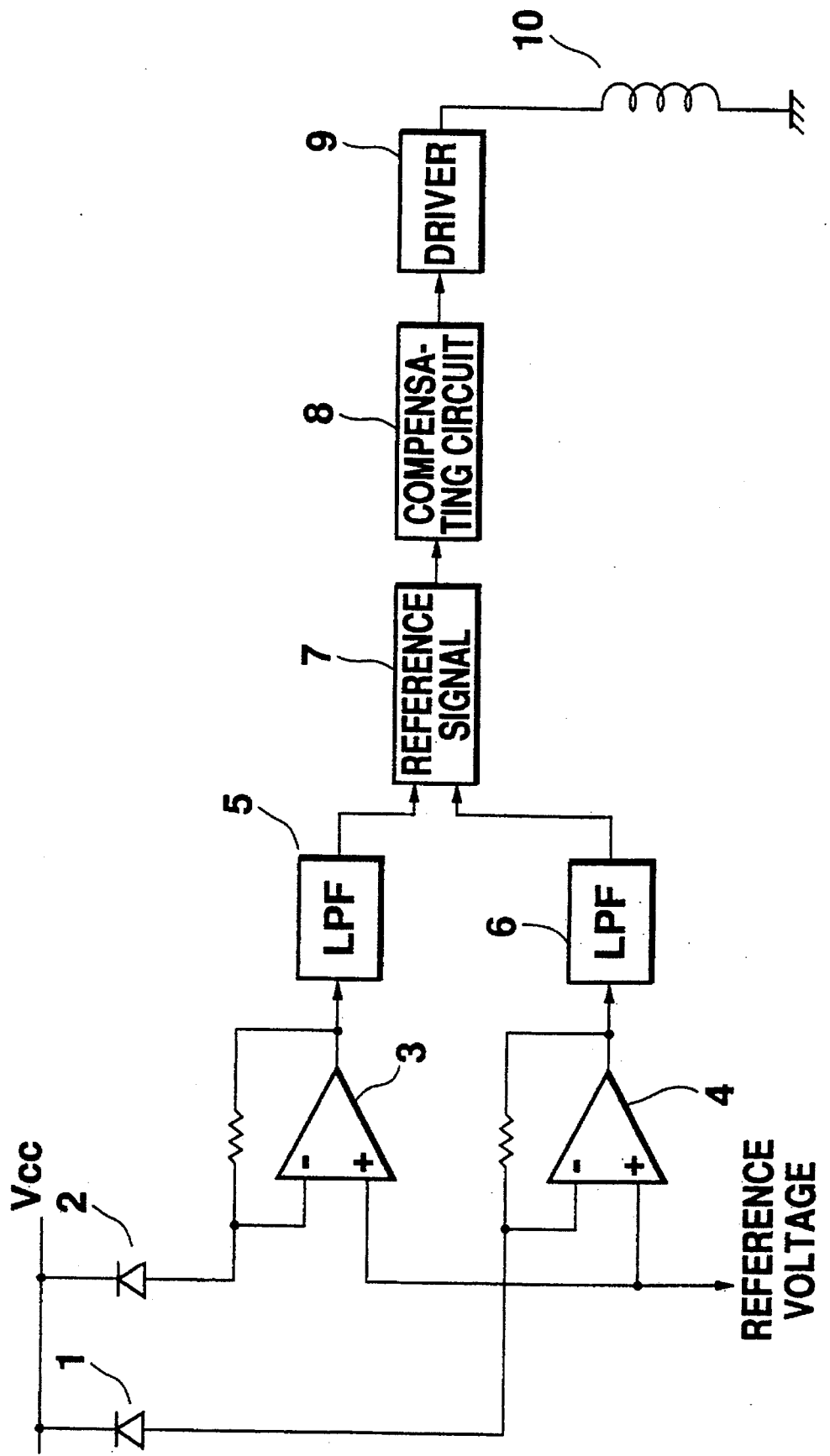
FIG. 1 is a block diagram showing a conventional example of this invention.
Figure 2:
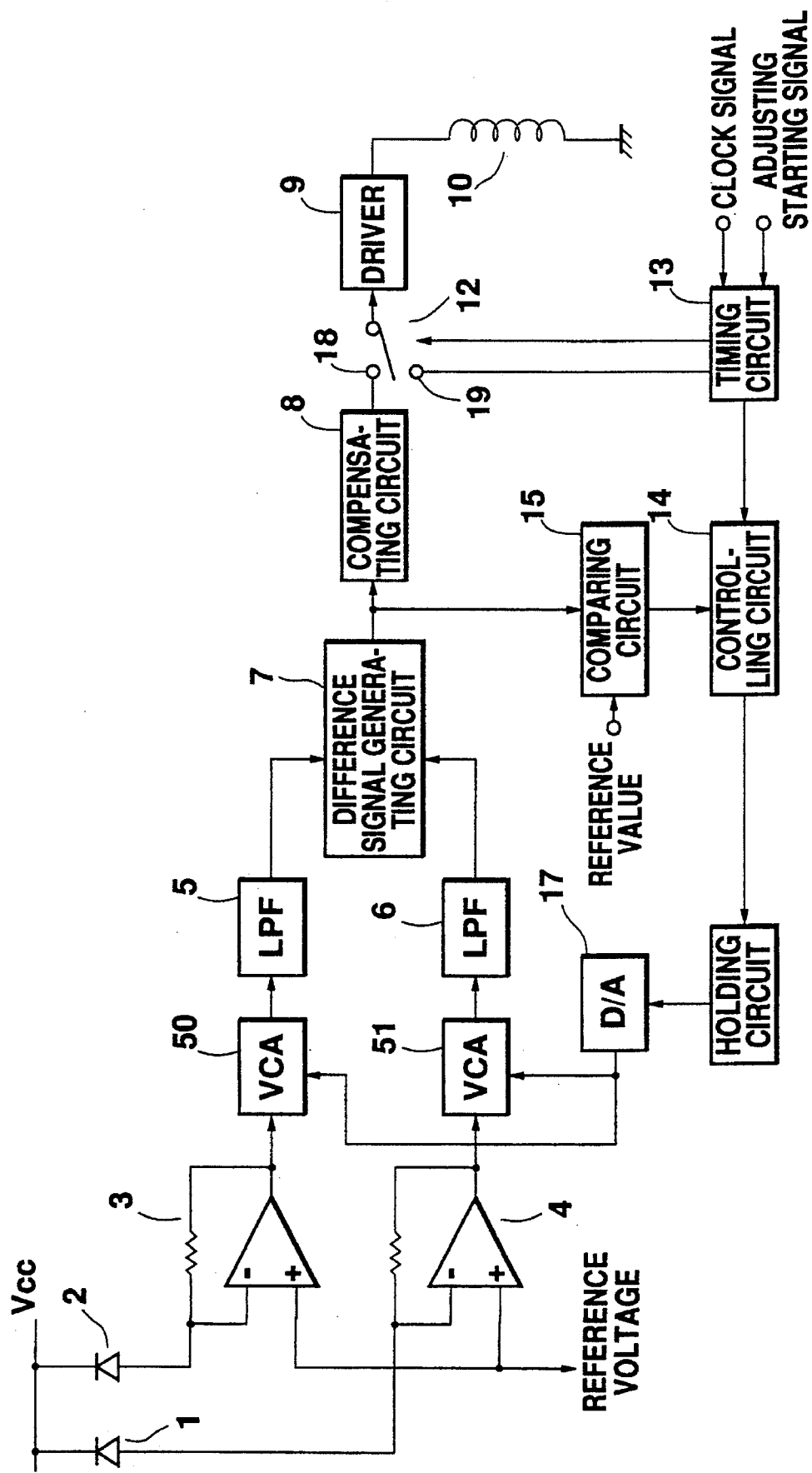
FIG. 2 is a block diagram showing am embodiment of an error correcting apparatus.

FIG. 2 is a circuit diagram according to an embodiment of this invention, in which the numerals designate respectively: 50, a VCA (voltage controlled amplifier); 51, a VCA with a reverse direction of change in the amplifying rate from the VCA 50; 12, a switch; 13, a timing circuit; 14, a controlling circuit; 15, a comparing circuit; 16, a holding circuit; 17, a D/A converter. The same components as in the aforementioned related art are designated with the same numerals and are omitted from explanation.

In FIG. 2, during a normal operation of correcting the track at the time of reproduction, the detected signal of the photo diodes 1 and 2 are applied to the difference signal generating circuit 7 via the VCA and the LPF. The difference signal generated from the difference signal generating circuit 7 is applied to the servo phase compensating circuit 8. The switch 12 is switched to the terminal 18 side, while the output signal from the servo phase compensating circuit 8 is applied to the driver 9 which then drives the tracking coil 10 in accordance with the output signal.

In the case of adjusting the difference signal, when the adjustment starting signal is input to the timing signal 13, it outputs a timing signal based on the clock signal to the switch 12 and the controlling circuit 14. Based on the timing signal the switch 12 switches from the terminal 18 side to the terminal 19 side, while the timing circuit 13 applies a test signal to the driver 9. The driver 9 drives the tracking coil by the test signal, and the sub-beams with their reflecting light being detected by the photo diodes 1 and 2 will cross the several-tens of track rows on the disc.

The detected signals of the photo diodes 1 and 2 generated when the beams cross the track rows are amplified by the VCA 50 and 51 and then applied to the difference signal generating circuit 7 via the LPFs 5 and 6. The difference signal generated from the difference signal generating circuit 7 is applied to the comparing circuit 15 which detects the average value of the difference signals, and compares this average value to a reference value so as to generate an error output as a first error signal. The first error signal is applied to the controlling circuit 14 and generates a controlling signal based on the error. The controlling circuit 14 causes the holding circuit 16 to hold the controlling signal in accordance with the timing signal generated by the timing circuit 13. The thus held controlling signal is then converted into an analog signal by the D/A converter 17, and applied to the VCA 50 and 51. The amplifying rate of the VCA 50 and 51 is varied by the controlling signal such that the average value of the difference signals will be equal to the reference value. After the adjustment, the switch is switched to the terminal 18 side in order to return to the normal operation. Even during the normal operation the controlling signal is held in the holding circuit 16, so that the sub-beam is on the correct beam position on the optical disc. Such a type of adjustment is carried out after mounting a first disc on the reproducing apparatus after starting the power supply.

Figure 3:
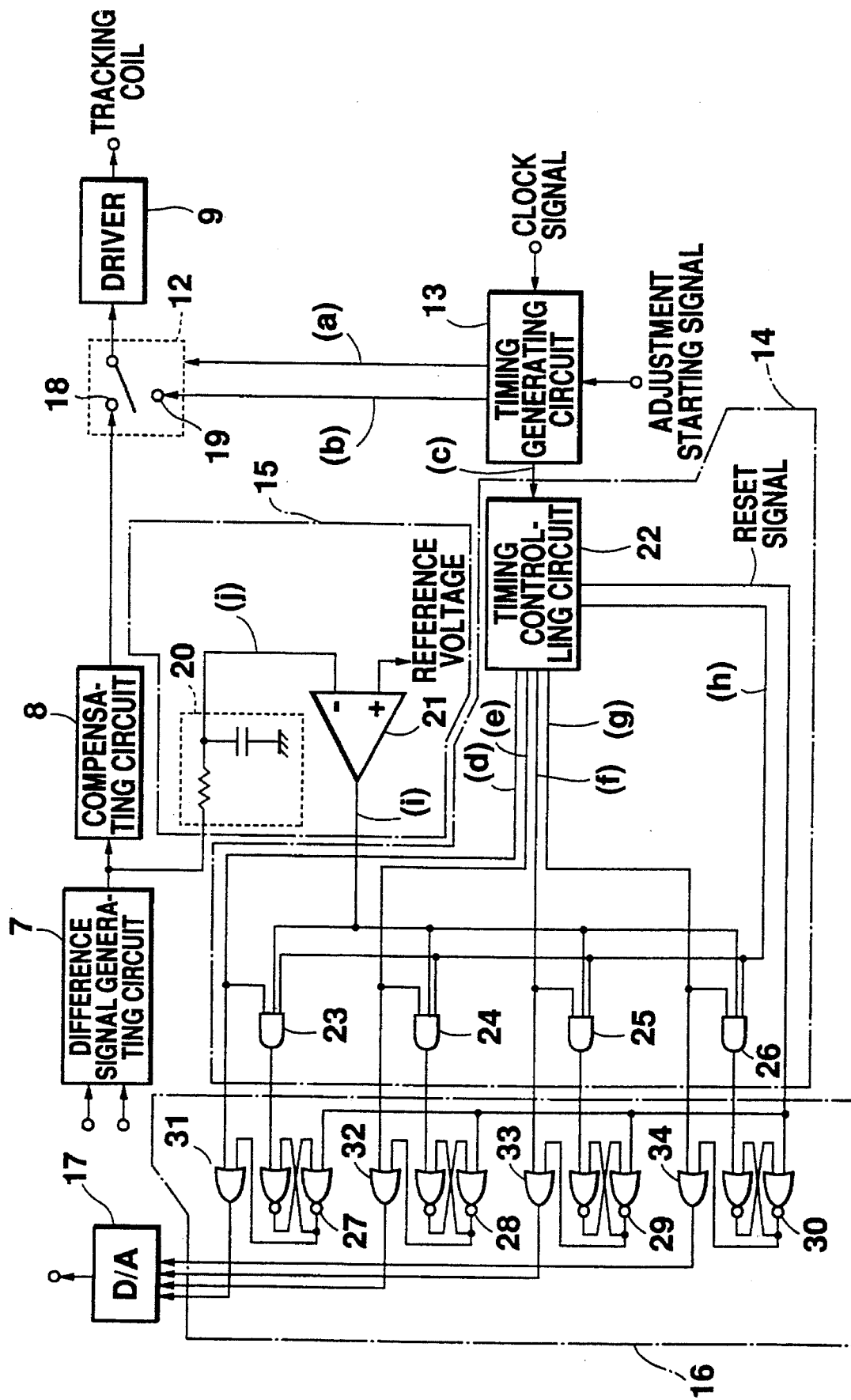
FIG. 3 is a specific circuit diagram of the controlling circuit, comparing circuit and holding circuit in FIG. 2.

FIG. 3 shows a specific circuit structure of the controlling circuit 14, the comparing circuit 15, and the holding circuit 16. In FIG. 3, when an adjustment starting signal is applied to the timing circuit 13, the timing circuit 13 applies the signal a to the switch 12 to switch the movable terminal of the switch 12 from the terminal 18 side to the terminal 19 side, so that the timing circuit 13 is coupled to the driver 9. The timing controlling circuit 22 generates a reset signal in accordance with the signal (c) generated by the timing circuit 13 to reset the flip-flops 27–30. Thereafter, the timing controlling circuit 22 serially generates the signals d, e, f and g on the basis of the signal c.

The signal d is generated at a "1" level from the timing controlling circuit 22 and is applied to the D/A converter 17 via the OR gate 31. As a result, the four-bit controlling data will become "1000" which is then applied from any of the flip-flops 27–30 to the D/A converter 17, so that the controlling signal having been generated by analog-conversion of the four-bit controlling data is applied to the VCA 50 and 51 in order to set the amplifying rate of the VCA 50 and 51. Since the signal d is also applied to the AND gate 23, the flip-flop 27 becomes able to hold the output of the comparator 21 when the signal h is generated by the timing controlling circuit 22. The signal b thus generated by the timing circuit 13 is applied to the driver 9.

When the driver 9 drives the tracking coil 10 of the subsequent stage, the difference signal generating circuit 7 generates a difference signal which is smoothed by the smoothing circuit 20 and is then compared to a reference value in the comparator 21. In the comparator 21, however, if the smoothed difference signal is larger than the reference value, the output (i) of the comparator 21 becomes a "0" level, while if the difference signal is smaller than that, the output (i) of the comparator 21 becomes a "1" level. After that, the signal (h) controlling the holding operation of the flip-flop becomes "1" level to be generated by the timing controlling circuit 22, so that the AND gate 23 generates an output in accordance with the output (i) of the comparator 21. The output of the AND gate 23 is held by the flip-flop 27. The four-bit controlling data "1000" is the mid point value of the controlling data, and if the controlling data changes in the "1111" direction, the difference signal of the difference signal generating circuit 7 changes in the positive direction, while if it changes toward the "0000" direction, the difference signal changes toward the negative direction.

The signal e is then generated as "1" from the timing controlling circuit 22 so as to be applied to the D/A converter 17 via the OR gate 32. As a result, the controlling data applied to the D/A converter 17 will become "W100", in which the upper most bit "W" represents data to be held by the flip-flop 27. Thus, since the controlling signal generated from the D/A converter 17 is varied, the amplifying rate of the VCA 50 and 51 will be set as a variable value. The signal e is also applied to the AND gate 24, while the flip-flop 28 is in a waiting state at that time. The signal b is generated from the timing controlling circuit 22 to be applied to the driver 9.

When the tracking coil 10 is driven, the difference signal generated from the difference signal generating circuit 7 is applied to the comparator 21 via the smoothing circuit 20, while the comparator 21 generates the output i in accordance with the magnitude of the smoothed difference signal. The timing controlling circuit 22 generates the signal h, while the AND gate 24 generates an output depending on the output i, so that the data x being that output will be held in the flip-flop 28.

Subsequently, the signal f is generated as "1" to be applied to the D/A converter 17 via the OR gate 33. The D/A converter 17 generates a controlling signal produced by analog conversion of the controlling data "WX10" from the D/A converter 17, so that the amplifying rate of the VCA 10 and 11 are variably set. The signal f is applied to the AND gate 25, while the flip-flop 29 is in the waiting state. The signal b is generated from the timing circuit 13 to be applied to the driver 9.

The difference signal generating circuit 7 then generates a difference signal which is applied to the comparator 21 via the smoothing circuit 20. The comparator 21 generates an output i in accordance with the average value of the difference signal. The signal h is generated while the AND gate 25 generates an output in accordance with the output i, so that data Y, being the aforementioned output, will be held.

Further, the signal g is generated to be applied to the D/A converter 17 via the OR gate 34, and the D/A converter 17 generates a controlling signal produced by analog conversion of the controlling data "WXY1" from the D/A converter 17, so that the amplifying rate of the VCA 10 and 11 will be set. The signal g is applied to the AND gate 26 while the flip-flop 30 is in the waiting state. The signal b is generated from the timing circuit 13 to be applied to the driver 9.

Thereafter, the difference signal from the difference signal generating circuit 7 is applied to the comparator 21 via the smoothing circuit 20, while the comparator 21 generates an output i in accordance with the difference signal. When the signal h is generated, the AND gate 26 generates an output based on the output i, while the flip-flop 30 holds the data Z being the aforementioned output.

When the controlling data "WXYZ" is held in the flip-flops 27–30, the timing circuit 13 stops generating the signal a in the switch 12, and the movable terminal of the switch 12 is switched to the terminal 18 side. Therefore, the output of the servo phase compensating circuit 8 is applied to the driver 9 for performing normal operation. During the normal operation, the controlling data "WXYZ" to be held in the flip-flops 27–30 are converted into analog signal by the D/A converter 17 so as to be applied to the VCA 50 and 51, leading to the correct tracking operation of the sub-beam on the optical disc.

By the aforementioned adjustment, even if the difference signal is larger or smaller than the reference value of the comparator 21, the difference signal can be made equal to the reference value.

Accordingly, in this invention, the beam position on the optical disc of the sub-beam for generating a tracking error signal can be readily adjusted in a significantly shorter time.

Also, since the adjustment is carried out when the disc is mounted on the reproducing apparatus, it is possible to always perform correct and highly accurate adjustment without generating any adjustment discrepancy due to vibration or change with passing of time, and to omit adjusting operations during the manufacturing processes.

What is claimed is:

1. An error correcting apparatus for correcting an error by driving a load in accordance with an error signal generated from a difference between a plurality of input signals, said apparatus comprising:
   (a) amplifying means for amplifying each of the input signals with a variable amplifying rate;
   (b) difference signal generating means connected to said amplifying means for outputting a difference signal from the amplified input signals;
   (c) comparing means connected to said difference signal generating means for comparing the difference signal to a reference signal to output a first error signal;
   (d) controlling means connected to said comparing means for outputting a controlling signal for varying the amplifying rate of said amplifying means in accordance with the first error signal; and
   (e) holding means connected to said controlling means for holding the controlling signal.

2. An apparatus according to claim 1, further comprising:
   (f) driving means for driving the load in accordance with the difference signal;
   (g) switching means provided between said difference signal generating means and said driving means for switching the difference signal and a test signal; and
   (h) timing generating means connected to said switching means and said controlling means for selectively performing the switching operation of said switching means and the generation of the test signal, and for generating a timing signal for controlling an operational timing of said controlling means.

3. An apparatus according to claim 1, wherein said holding means has a plurality of flip-flops for holding the controlling signal by serial switching operations of the flip-flops.

4. An apparatus according to claim 2, wherein:
   said holding means has a plurality of flip-flops; and
   said controlling means serially switches the flip-flops in accordance with the timing signal output from said timing generating means, the controlling signal being held in said flip-flops.

5. A tracking error correcting apparatus used in a reproducing apparatus for optical disc, comprising:
   (a) two amplifiers, for amplifying two electric signals based on two tracking optical beams, with variable amplifying rates;
   (b) a difference signal generating circuit connected to said amplifier for outputting a difference signal from the amplified electric signals;
   (c) a comparing circuit connected to said difference signal generating circuit for comparing the difference signal to a reference signal and outputting a first error signal;
   (d) a controlling circuit connected to said comparing circuit and outputting a controlling signal for varying the amplifying rate of said amplifier; and
   (e) a holding circuit connected to said controlling circuit for holding said controlling signal.

6. An apparatus according to claim 5, further comprising:
   (f) a driving circuit for driving a tracking coil in accordance with the difference signal;
   (g) a switch provided between said difference signal generating circuit and said driving circuit, for switching the difference signal and a test signal; and
   (h) a timing circuit connected between said switch and said controlling circuit for selectively performing the switching operation of said switch and the generation of the test signal, and for generating a timing signal for controlling the operational timing of said controlling circuit.

7. An apparatus according to claim 5, wherein:
   said holding circuit has a plurality of flip-flops for holding the controlling signal by serial switching operations.

8. An apparatus according to claim 6, wherein:
   said holding circuit has a plurality of flip-flops; and
   said controlling circuit serially switches said flip-flops in accordance with the timing signal output from said timing circuit, the controlling signal being held in said flip-flops.

* * * * *

UNITED STATES PATENT AND TRADEMARK OFFICE
CERTIFICATE OF CORRECTION

PATENT NO. : 5,610,887
DATED : March 11, 1997
INVENTOR(S) : Masashi Arai; Akira Tsukihashi It is certified that error appears in the above-indentified patent and that said Letters Patent is hereby corrected as shown below:

```
Title page insert --[30] Foreign Application Priority Data
November 22, 1993 [JP] Japan ......... HEi 5-291998--.
```

Signed and Sealed this

Sixteenth Day of September, 1997

*Attest:*

BRUCE LEHMAN

*Attesting Officer*     *Commissioner of Patents and Trademarks*